UNITED STATES PATENT OFFICE.

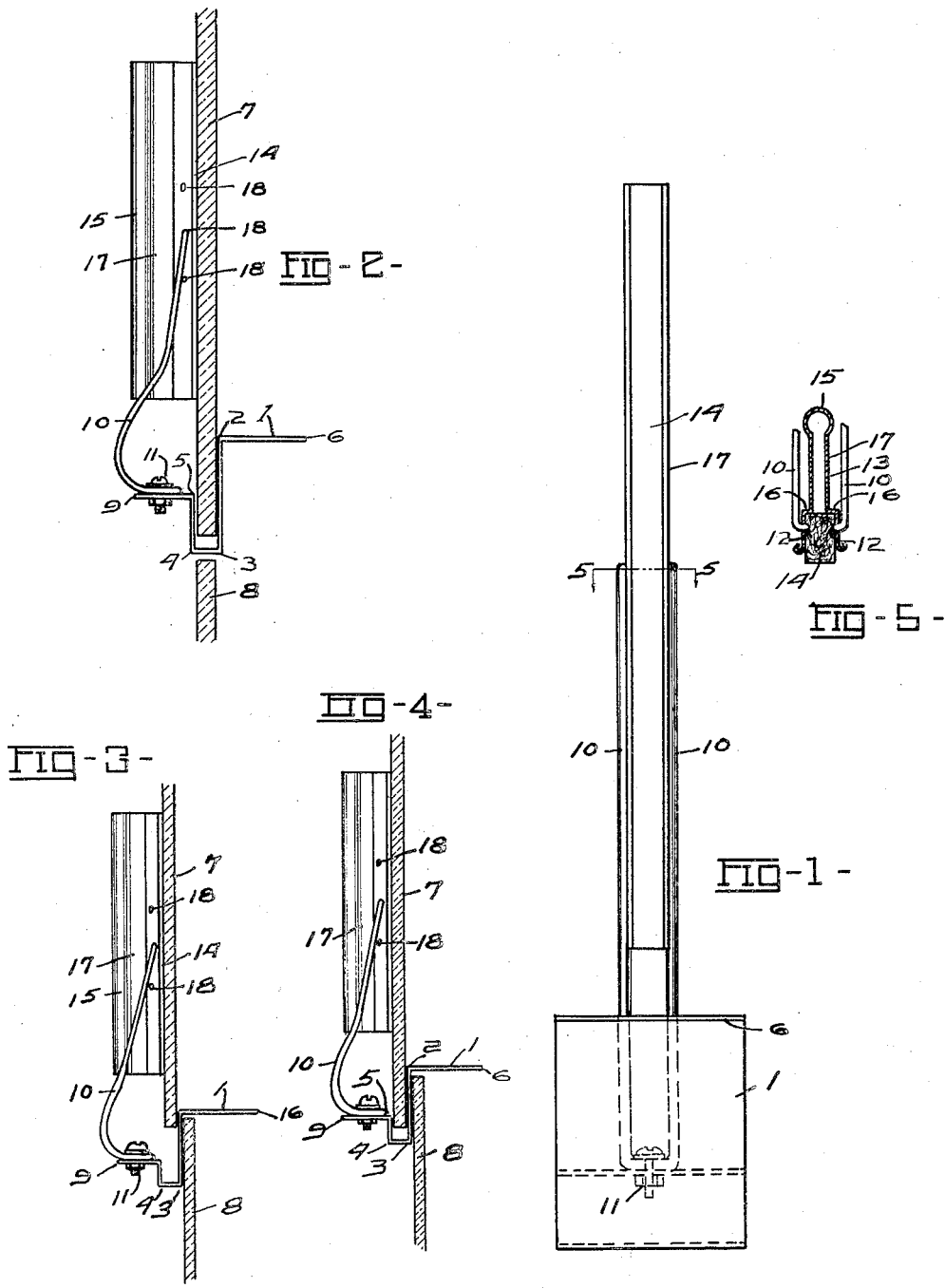

VICTOR H. CHRISTEN, OF TOLEDO, OHIO.

GLASS-CLEANER.

1,327,146.

Specification of Letters Patent.

Patented Jan. 6, 1920.

Application filed December 26, 1918. Serial No. 268,411.

*To all whom it may concern:*

Be it known that I, VICTOR H. CHRISTEN, a citizen of the United States, and a resident of Toledo, in the county of Lucas and State of Ohio, have invented a certain new and useful Glass-Cleaner; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates particularly to a device for wiping glass to remove deposits thereon, such as moisture. It finds its most advantageous use when applied or attached to wind shields of automobiles or windows of engines and electric cars for removing the snow and rain from the wind shields or the windows.

The invention may be contained in structures that partake of different forms. I have selected one of such structures as an illustration of constructions embodying the invention and shall describe the same hereinafter. The construction selected is illustrated in the accompanying drawings.

Figure 1 of the drawings is a front view of the construction selected. Fig. 2 is a side view of the construction and illustrates the construction in position when used in connection with one form of a wind shield. Fig. 3 is also a side view of the construction and shows the construction when located in position for use in connection with the form of wind shield commonly found on the Ford automobile. Fig. 4 also illustrates the construction and particularly shows its position when used in connection with a wind shield such as that commonly found on the Hupmobile. Fig. 5 illustrates a sectional view taken through the line 5—5 indicated in Fig. 1.

In the figures, 1 indicates a broad strip of metal which is bent at right angles at four different points. At 2 it is bent downward, at 3 it is bent laterally, at 4 it is bent upward, and at 5 it is bent laterally. The portion between the end 6 and the bend 2 forms a handle for shifting the article along a wind shield. In the application of the wiper in connection with the wind shields of different forms the strip 1 is so formed that it may be used in connection with wind shields that have abutting sashes, or have overlapping sashes. In the form of wind shield shown in Fig. 2 the portion of the strip between the corners 3 and 4 is located between the abutting edges of the glass, while in the form of wind shields shown in Figs. 3 and 4 which have overlapping edges, the portion between the corners 2 and 3 is located between the overlapping edges, such as between the two parts 7 and 8 of the wind shield. The length of the portion between the corners 2 and 3 is preferably as wide or greater than the width of the overlap of the parts of the wind shield. The length of the portion between the corners 3 and 4 is substantially the same as the thickness of the glass of the wind shield. The length of the portion between the corners 4 and 5 may be of any length and may be of such length that it will rest against the outside surface on the lower edge of the upper part 7 of the wind shield. The wiper is attached to the strip 1 between the corner 5 and the end 9 of the strip.

The wiper is supported by a U shaped spring wire 10 and is attached to the strip 1 by a suitable clamping means such as the nut and bolt 11. The ends of the wire 10 are provided with inturned portions 12, and the wire is so formed that its spring will bring or tend to bring the inturned portions toward each other.

The wiper member is supported on the inturned portions 12 of the ends of the spring wire 10. The wiper is formed preferably of a strip 13 of sheet metal which is suitably bent and shaped to form a flat hollow member 17, convenient and attractive in form, for supporting a strip of felt 14 between the side edges of the sheet metal strip. The strip 13 is preferably bent so as to form a beaded back edge 15 in the felt supporting member, and a channel shaped edge for receiving the felt and supporting it in position. The channel part thus formed of the edges of the strip 13 has laterally extending portions 16 that extend across the back or cover a portion of the back of the felt 14 so as to prevent the felt from being pushed back between the sides of the sheet metal felt supporting member. The sides of the bead of the back extends to near the arms of the spring supporting member and thus limits rotation of the wiper when it is shifted along the shield.

The felt supporting member 17 is provided with a plurality of openings 18, into which the turned end portions 12 of the wire 10 may be inserted to hold the wiper in position and to connect it with the strip 1. The position of the wiper may be adjusted with reference to the strip 1 by inserting the ends of the wire 10 in one or the other of the pairs of holes 18. The felt member 14 protrudes from the channel edge of the supporting member 17, and by the spring member 10 is pressed against the wind shield. When the strip 1 is shifted laterally the felt 14 will be wiped across the surface of the glass, and thus snow and water will be removed from the glass.

I claim:

In a glass cleaner for automobile wind shields formed of two overlapping parts, a broad strip located between the overlapping portions of the parts, a U-shaped spring member connected to the broad strip, a wiper bar formed of sheet metal bent in the form of a U and located between the legs of the U-shaped member and having a back edge portion extending laterally into proximity to the legs of the U-shaped member to limit rotation of the wiper bar when in use, a wiper strip located between the edges of the wiper bar, the wiper bar having openings near its edges for receiving the ends of the U-shaped spring member.

In testimony whereof I have hereunto signed my name to this specification.

VICTOR H. CHRISTEN.